United States Patent [19]

Mott et al.

[11] 4,011,709
[45] Mar. 15, 1977

[54] HARVESTING PLATFORM

[75] Inventors: Roger Eugene Mott, Bettendorf, Iowa; Darwin Carl Bichel, East Moline, Ill.

[73] Assignee: Deere & Company, Moline, Ill.

[22] Filed: Nov. 13, 1974

[21] Appl. No.: 523,507

[52] U.S. Cl. .................. 56/10.4; 56/11.6; 56/14.4; 56/208

[51] Int. Cl.² ........................ A01D 69/00

[58] Field of Search ............. 56/14.9, 15.1, 15.2, 56/15.3, 14.4, 10.2, 11.6, 14.3, 208, 221, 224, DIG. 10, DIG. 15, 10.4, 257, 260, DIG. 9, 15.8

[56] References Cited
UNITED STATES PATENTS

| | | | |
|---|---|---|---|
| 2,746,230 | 5/1956 | Reimer | 56/257 |
| 2,850,864 | 9/1958 | Rohweder | 56/257 |
| 2,915,870 | 12/1959 | Hume | 56/208 |
| 3,474,606 | 10/1969 | Oehler et al. | 56/208 |
| 3,528,231 | 9/1970 | Keller et al. | 56/208 |
| 3,771,298 | 11/1973 | Schmidt | 56/14.6 |
| 3,896,610 | 7/1975 | Hiniker | 56/260 |

FOREIGN PATENTS OR APPLICATIONS

| | | | |
|---|---|---|---|
| 106,531 | 2/1967 | Denmark | 56/14.4 |
| 1,935,594 | 7/1970 | Germany | 56/11.6 |

*Primary Examiner*—Louis G. Mancene
*Assistant Examiner*—James D. Hamilton

[57] ABSTRACT

A self-propelled combine has a forwardly extending, vertically adjustable crop feeder housing and a transversely elongated, cutter bar type harvesting platform mounted on the forward end of the housing. The platform includes a floor and a transverse auger that extends the width of the platform and converges the crop along the floor to the center of the platform, for discharge rearwardly to the feeder housing. A cutter bar spans the width of the platform along the leading edge of the floor and is mounted for fore and aft extension or retraction into different fore and aft positions to vary the distance between the cutter bar and the auger. Members are also provided for adjusting the tilt of the cutter bar about a transverse horizontal axis, so that the cutter bar skids, which ride along the ground, can be adjusted to the desired angle relative to the ground.

4 Claims, 7 Drawing Figures

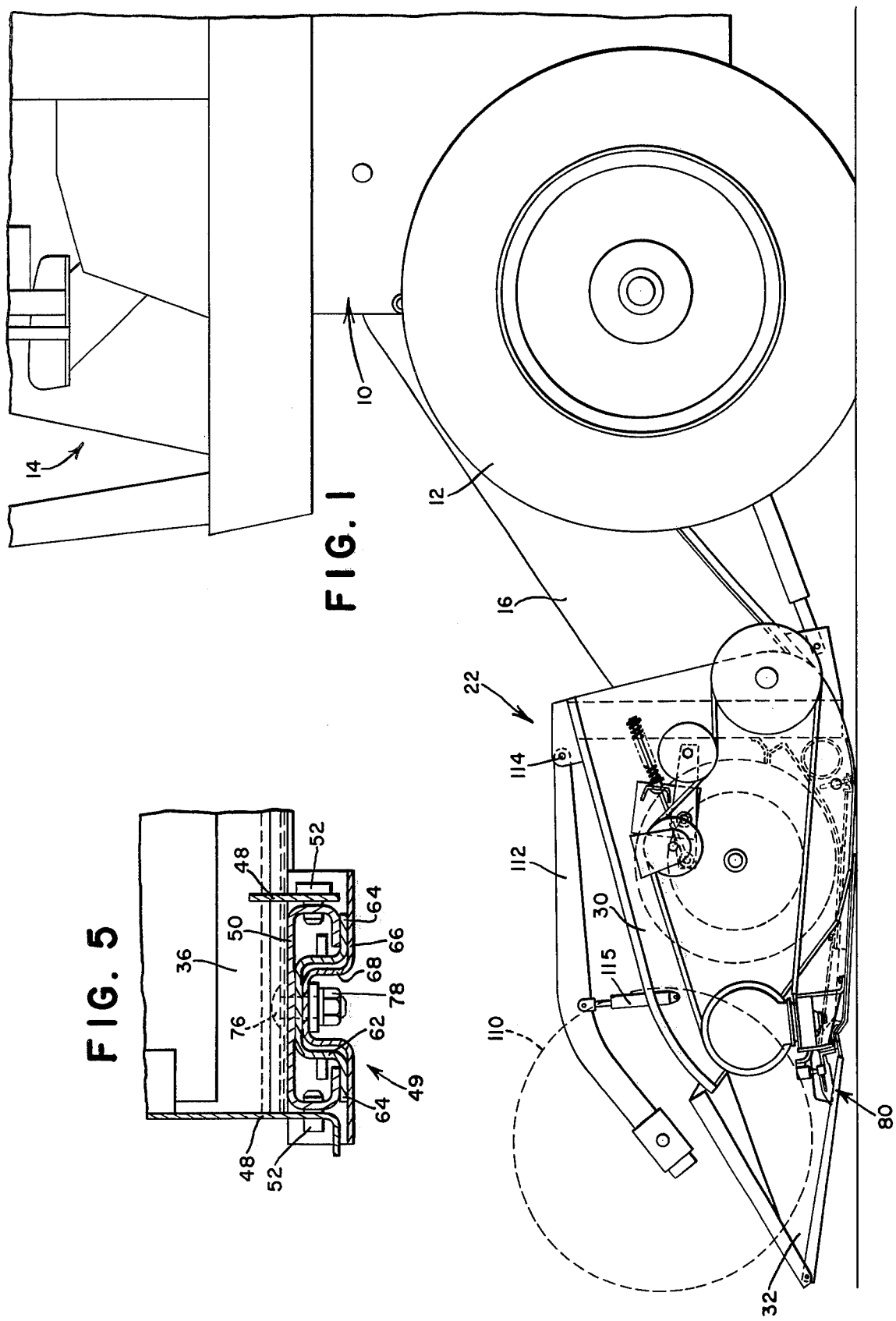

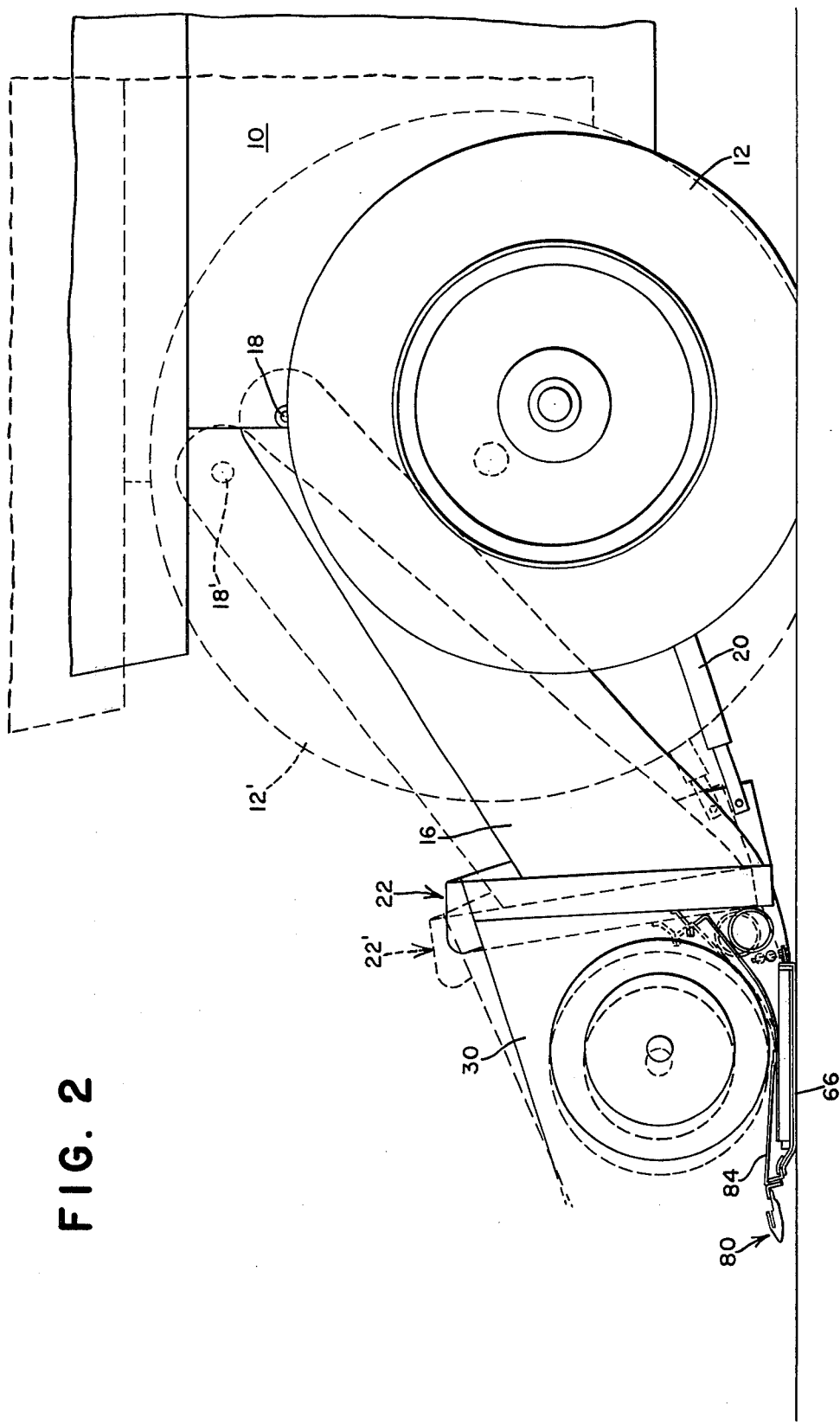

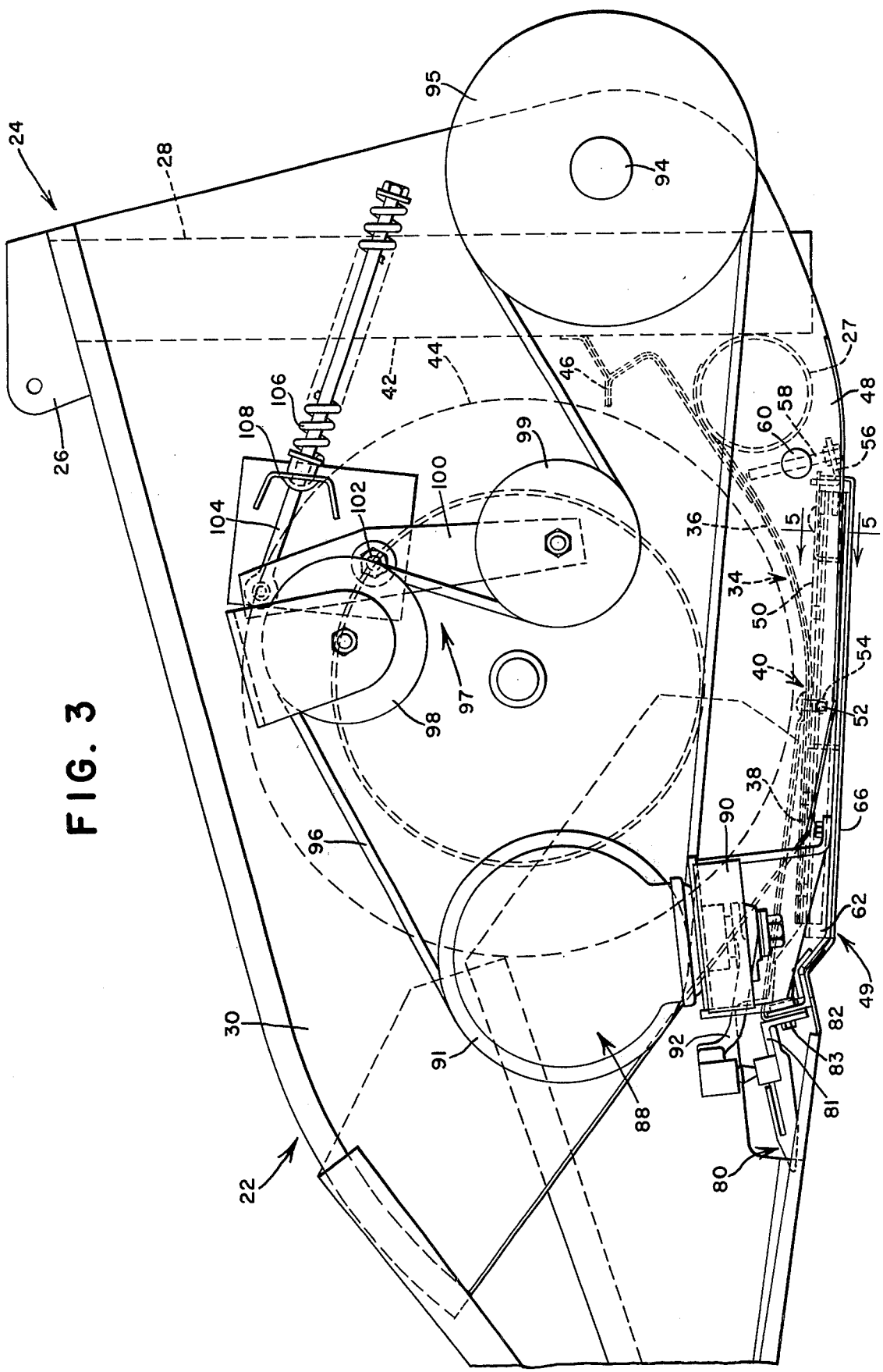

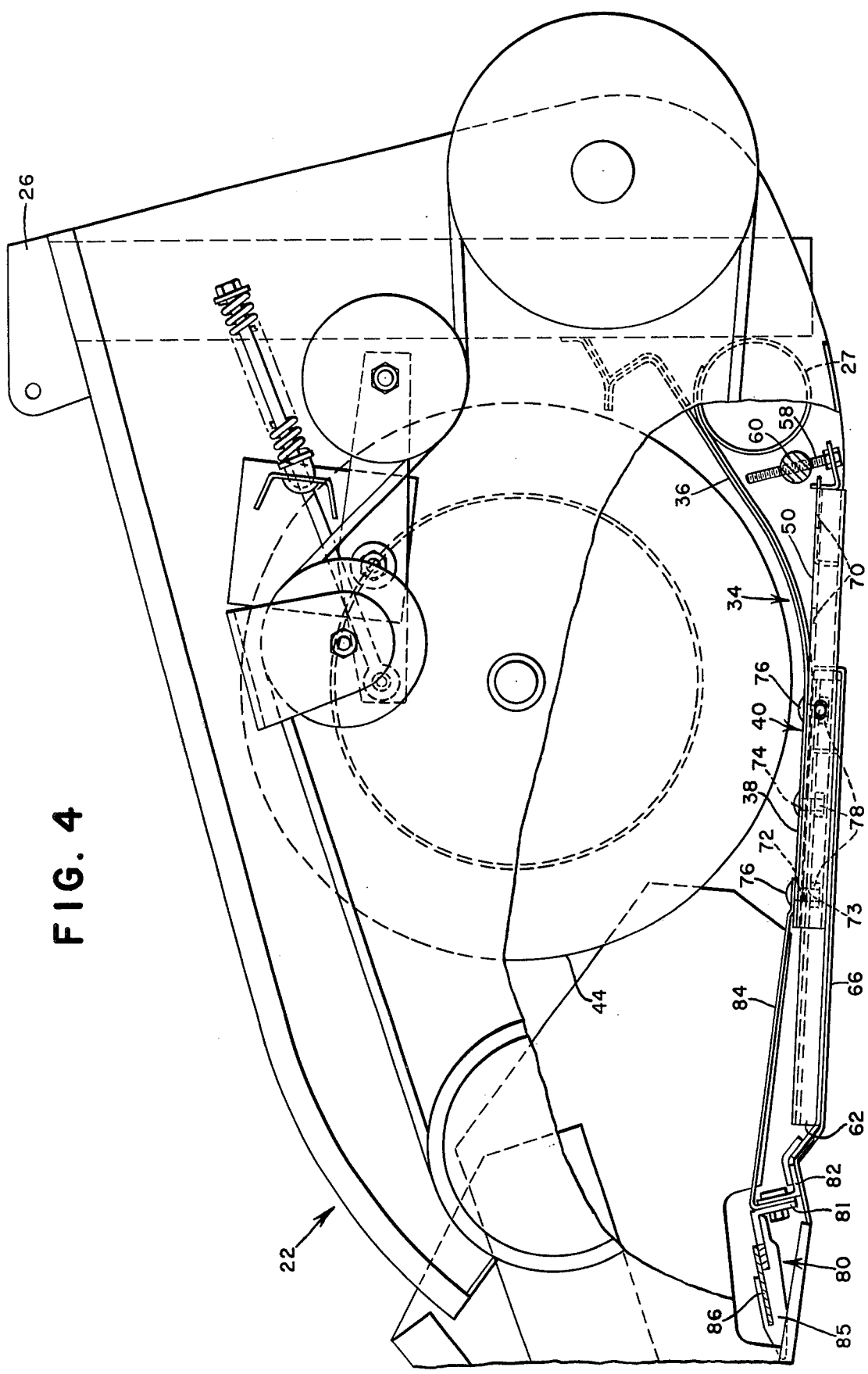

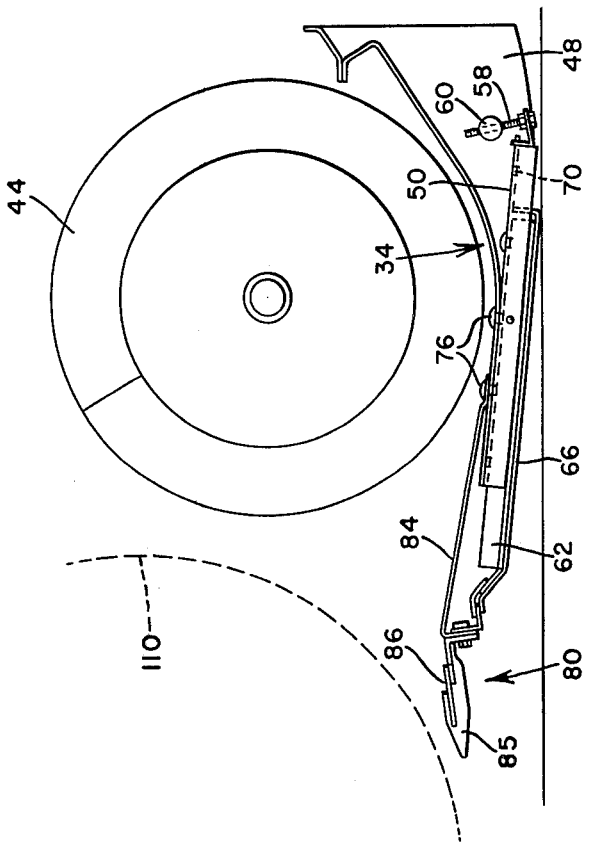
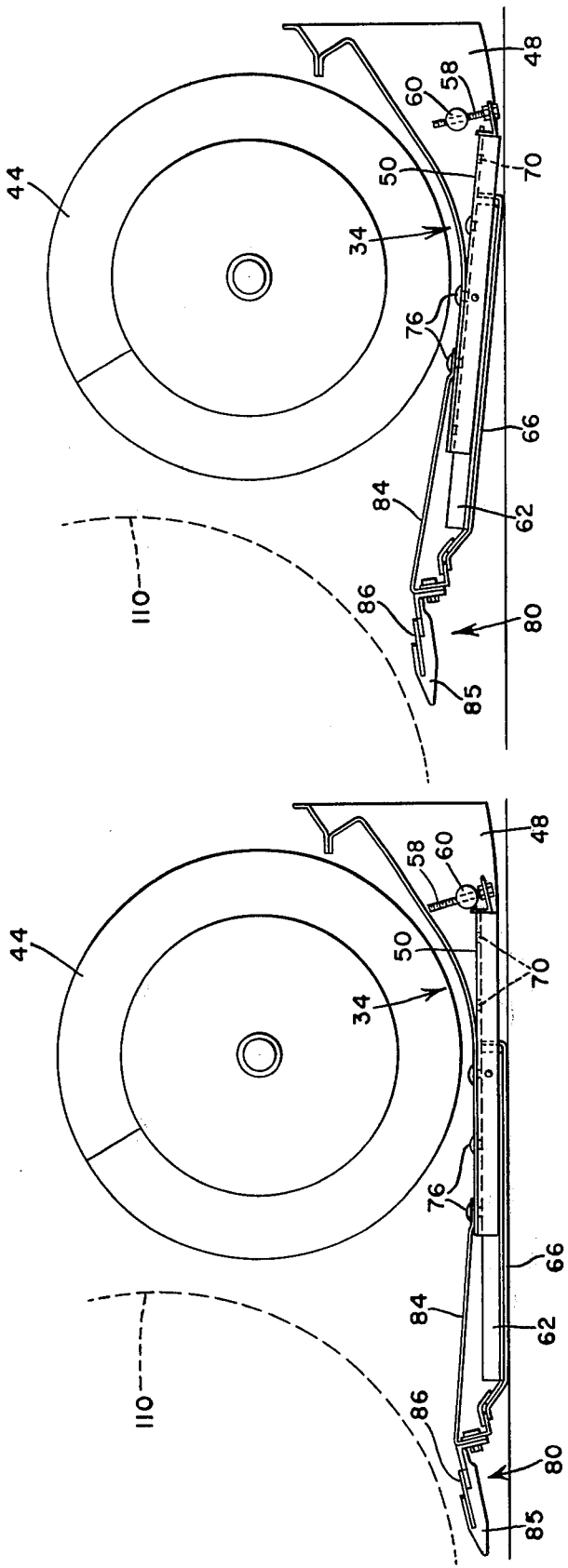

HARVESTING PLATFORM

BACKGROUND OF THE INVENTION

This invention relates to an improved cutter bar type harvesting platform for a combine or the like.

Cutter bar type platforms are conventionally carried in front of self-propelled machines, such as combines, and are transversely elongated relative to the direction of travel. The platform is also conventionally vertically adjustable, and, when the platform is being used to harvest such crops as soybeans or the like, the platform is operated as close to the ground as possible. Such platforms conventionally include a floor with a transverse cutter bar along the leading edge of the floor. A reel is also normally provided above the cutter bar and moves the crop toward the cutter bar as the machine advances, the cutter bar serving the crop from the ground. The material leaving the cutter bar is fed to a transverse auger immediately above the floor, and the auger converges the crop along the floor toward the center of the platform, for its rearward discharge. Normally the cutter bar is rigidly attached to the forward end of the platform floor, although it is known to provide flexible type cutter bars, which flex vertically relative to the floor so that the cutter bar follows the contour of the ground.

The tilt of the cutter bar and in the forward portion of the floor, or the angle that the cutter bar and the floor make with the ground about a horizontal transverse axis, is of importance for the proper feeding of the crop to the auger. Also, skids are conventionally provided along the bottom of the platform, and the tilt angle of the skids is also important. However, modern combines are conventionally provided with a wide range of tire sizes and types to accommodate different types of field conditions and the desires of different purchasers. The tire size, of course, affects the height of the combine, which, in turn affects the tilt angle of the platform, and it has been found that when the platform is designed for optimum tilt angle for one size of tire, the tilt angle is substantially less than optimum for different sizes of tires.

It has also been discovered that the distance between the cutter bar and the auger for optimum feeding characteristics varies with different crops and crop conditions. Also, different types of reels are used for feeding different crops to the cutter bar, and adjustments are also conventionally provided to provide for different positions of their reel relative to the cutter bar. Again, the optimum position of the cutter bar relative to the auger varies with the type of reel and reel position. For example, when the platform is harvesting soybeans or dry, easy to feed crops, or grain crops where the straw is long and dry, or when a bat type reel is used, the platform performs better when the cutter bar is a substantial distance in front of the auger, so that the reel sweeps the cutter bar and the crop lays down on the platform floor in front of the auger, the crop feeding more evenly than if the crop were engaged by the auger immediately upon leaving the cutter bar. On the other hand, in wet crops, such as rice, or in down crops, and when pick-up type reel is being used, the platform performs better if the cutter bar is relatively close to the auger, so that the reel positively feed the crop to the auger.

SUMMARY OF THE INVENTION

According to the present invention, there is provided an improved cutter bar type harvesting platform for use with combines and the like. More specifically, the improved cutter bar platform is provided with means for adjusting the cutter bar for optimum positioning of the cutter bar relative to the other platform components. Still more specifically, means are provided on the platform for mounting the cutter bar for fore and aft adjustment into alternate fore and aft positions relative to the auger. Also, means are provided for adjusting the tilt of the cutter bar, the floor and platform skids about a transverse horizontal axis, so that the cutter bar is maintained at the optimum tilt angle regardless of the tire size on the combine.

An important feature of the invention resides in the mounting of a wobble type cutter bar drive on the end of the cutter bar, so that the drive is adjusted with the cutter bar. Also according to invention, a belt tensioning device is provided in the belt drive that serves as an input to the wobble type drive to provide the proper belt tension regardless of the position of the cutter bar and the wobble drive mounted thereon.

Another feature of the invention resides in the provision of the platform floor with sufficient flexibility in the area of the axis about which the cutter bar tilt is adjusted, to accomodate the tilt adjustment of the cutter bar.

BRIEF DESCRIPTION OF THE DRAWINGS

FIG. 1 is a side elevation view of the forward portion of a combine showing an embodiment of the improved harvesting platform mounting thereon.

FIG. 2 is a schematic illustration, similar to FIG. 1, but showing a combine with different size tires in dotted lines to illustrate the effect that the combine tire size has on the tilt angle of the platform.

FIG. 3 is an enlarged side elevation view of the platform showing the cutter bar in its rearmost position relative to the auger.

FIG. 4 is similar to FIG. 3, but showing the cutter bar in its forwardmost or extended position, with a portion of the platform sidewall broken away.

FIG. 5 is an enlarged rear view of one of the adjustable mounting means for mounting the cutter bar on the header, as viewed along line 5—5 of FIG. 3, FIG. 5 being on the first sheet of drawings with FIG. 1.

FIG. 6 is a schematic vertical section schematically showing the cutter bar in its extended position.

FIG. 7 is a view similar to FIG. 6, but showing the cutter bar in a mid position, and in a different tilt position than in FIG. 6.

DESCRIPTION OF THE PREFERRED EMBODIMENT

The invention is embodied in a self-propelled combine having a main separator body 10, only the forward portion of which is shown in FIGS. 1 and 2. As is conventional, the combine is mounted on a pair of forward drive wheels 12 and has a forward, elevated operator's station 14 and a forwardly extending crop feeding housing 16, that is mounted on the body for vertical adjustment about a transverse pivot 18 by means of a lift cylinder 20.

The invention is embodied in an improved cutter bar type platform, indicated generally by the numeral 22 and mounted on the forward end of the feeder housing 16 for vertical adjustment therewith. Such cutter bar type platforms are generally detachably mounted on the forward end of the feeder housing and are used to harvest grain crops, soybeans, or the like. The platforms are transversely elongated and are available in a wide variety of widths greater than the width of the combine body, the width of the platform generally being matched to the capacity of the combine. For example, the cutter bar platforms manufactured by the Assignee herein are available in widths between 10 and 24 feet in two-foot increments.

The platform has a transversely elongated frame 24 that includes a transverse upper beam 26 along the upper rear edge of the platform and a transverse tubular beam 27 generally below the upper beam 26, both of said beams spanning the width of the platform. A plurality of upright frame members 28 interconnect the beams 27 and 28. A pair of upright, fore and aft extending side panels 30 are disposed at opposite ends of the platform, the forward ends of the side panels being provided with crop dividers 32 that are pointed at their forward ends, the pointed forward ends normally being disposed close to the ground when the machine is operating.

A transversely elongated floor, indicated generally by the numeral 34, spans the width of the platform between the opposite side panels 30 and includes an arcuate rear portion 36 that is concave upwardly and forwardly and rest on the top and forward side of the tubular lower beam 27. The floor 34 also includes a generally horizontal front portion 38 that extends tangentially forwardly from the rear portion 36, a flexible area 40 being provided at the juncture of the front and rear floor portions to permit a small amount of vertical movement of the forward end of the front portion relative to the fixed rear portion 36. The platform has a generally upright rear wall 42 extending upwardly from the rearward end of the floor 34 and attached to the front side of the upright frame member 28. As is conventional, the rear wall 42 is provided with a central crop transfer opening that registers with the open forward end of the feeder housing 16. As is also conventional, a transverse auger 44 is mounted immediately above the floor, coaxial with the arcuate rear floor portion 36, the auger 44 spanning the width of the platform between the side walls and being operative to move the crop along the floor to the center of the platform, where it discharges the crop through the opening in the rear wall to a crop feeding mechanism in the feeder housing 16. An auger stripper 46 is provided adjacent the rear side of the auger at the rearward end of the rear floor portion 36 to prevent the crop from being carried over the auger, the auger rotating in a counterclock-wise direction as viewed in the drawings.

A plurality of upright, fore and aft gusset plates 48 are rigidly attached to the under side of the rear floor portion 36, preferably by welding, the lower tubular beam 27 extending transversely through the gusset plates, which are attached to the beam 27 and function as reinforcing members for the rear portion of the floor. The gusset plates are arranged in pairs, which are disposed at intervals across the length of the platform 22. The number of pairs of gusset plates, of course, depends on the width of the platform, a pair of gusset plates preferably being provided approximately every 3 feet across the platform, with a pair being provided at each end of the platform. A cutter bar mounting means 49 is disposed between each pair of gusset plates 48, and since each mounting means 49 is substantially identical, only one mounting means will be described in detail, FIG. 5 showing a rear view on one of the mounting means.

The mounting means 49 includes a fore and aft channel-shaped support member 50 that is open downwardly and disposed between the gusset plates 48, the opposite sides of the channel-shaped member 50 being adjacent to the respective gusset plates. A pair of pins 52 extend transversely from the opposite sides of the channel-shaped member 50 into slots 54 in the opposite gusset plates 48, the slots permitting a small amount of relative fore and aft movement of the channel members 50 relative to the gusset plates while the channel member pivots about the horizontal transverse axis of the pins 52. As is apparent, the pins 52 are approximately in the fore and aft mid point of the channel-shaped members 50, and the portion of the member 50 forwardly of the pins 52 is rigidly attached to the under side of the front floor portion 38 by welding or the like. A bracket 56 is attached to the rearward end of the channel-shaped member 50 and a generally vertical bolt 58 extends upwardly through the bracket 56 and through a threaded diametral bore in a transverse bar 60 attached to and extending between the opposite gusset plates 48. The head of the bolt engages the under side of the bracket 56, and rotation of the bolt causes the rearward end of the channel-shape member 50 to move vertically relative to the gusset plates about the pins 52. Since the rearward floor portion 36 is rigid with the gusset plates and the forward floor portion 38 is rigid with the channel-shaped member adjustment of bolt causes the floor to flex to a limited degree in the flexible area 40 above the pivot pins 52. The pivot axis actually lies in the floor, and the slots 54 accommodate the limited fore and aft movement of the channel-shaped member 50 relative to the gusset plates caused by the offset axis during the vertical adjustment.

A channel-shaped arm 62 is mounted within each channel-shaped member 50 in a telescoping fashion, the top of the arm seating against the top inside of the channel-shaped member 50. The arm 62 also includes a pair of outwardly extending flanges 64 seating against the bottom of the member 50. A fore and aft extending skid plate 66 is attached to the under side of the arm 62 and includes an upwardly extending central channel 68 that fits in the arm 62. The channel-shaped member 50 is provided with five equally spaced vertical bores 70 that are spaced in a fore and aft direction along the length of the channel-shaped member, and the arm 62 and the skid plate 66 are respectively provided with three equally spaced vertical bores 72 and 73 having the same fore and aft spacing as the bores 70 in the channel-shaped member, the bores 72 being adjacent to the rearward end of the arm. The front floor portion 38 above each channel-shaped member is provided with three, vertical bores 74 that are equally spaced in a fore and aft direction and in vertical alignment with the three forward bores 70 in the channel-spaced member, the rear bore 74 being aligned with the center bore 70 above the axis of the pins 52.

As apparent, the arm 62 can be aligned in three different positions relative to the channel-shaped member wherein the three bores in the arm are aligned with three of the five bores in the channel-shaped member. In the rearmost position, as shown in FIG. 3, the three bores in the arm are aligned with the three rearward bores in the channel-shaped member, while in the forward position, as shown in FIG. 4, the three bores in the arm are aligned with the three forward bores of the channel-shaped member. Of course, in the intermediate position, the three arm bores 72 are aligned with the three center bores 70 of the channel-shaped member. Bolts 76 extend downwardly through the aligned bores and are secured therein by nuts 78, which abut the bottom of the skit plate. In the forward position, the bolts extend through the three bores 74 in the floor as well as through the bores 70, 72, and 73. Due to limited access to the second bore from the rear of the channel-shaped member, as a result of the floor immediately above the bore, only two bolts can be utilized in the intermediate and rearmost positions of the arm.

A transversely elongated cutter bar 80 spans the width of the platform along the leading edge of the floor 34, the cutter bar being of conventional, reciprocating mower design. The cutter bar includes an angle iron beam member 81 that spans the width of the platform, the vertical leg of which seats against the vertical leg of a second angle iron 82 that also spans the width of the platform and is secured to the forward end of the arms 62. The cutter bar is secured to the forward end of the arms by a series of bolts 83 which extend through the vertical flanges of the angle irons 81 and 82. A generally horizontal, pan-like seal or floor extension 84 spans the width of the platform and has a vertical end that is secured between the angle irons 81 and 82, the seal extending rearwardly from the cutter bar and overlapping the forward floor portion 38. As is apparent, the rearward edge of the seal seats against the top of the forward floor portion and is provided with a plurality of vertical bores that are aligned with the rearward set of bores on the forward floor portion when the arms are in their rearward position, as shown in FIG. 3, the bolts 76 also extending through the seal to provide a smooth transition from the cutter bar back to the floor. As is also apparent from FIG. 4, the bore in the seal aligns with the front set of bores in the forward floor portion when the arms are in the extended position, the front bolt 76 securing the rearward end of the seal 74.

As is conventional, the cutter bar 80 includes a large number of mower guards 85 that extend forwardly from the front angle iron or beam 81, and a sickle 86 is mounted for transverse reciprocation in the mower guards 85. The sickle 86 is driven by a wobble type drive 88 that is attached to the left end of the cutter bar 80 by means of a mounting bracket 90, the front end of the mounting bracket being attached to the rear angle iron 82, while the rearward end of the mounting bracket is attached to the arm 62 of the outer left mounting means, so that the drive 88 moves with the cutter bar 80. The wobble type drive is well known, only the drive housing being shown in the drawings, the drive having a rotary input sheave 91, that rotates about a horizontal transverse axis, and a reciprocating output arm 92 that oscillates about a vertical axis and has its forward end attached to the sickle 86 to reciprocate the sickle.

The platform has a transverse drive shaft 94 on its rearward side, as is well known, the drive shaft being driven from a power source on the combine. A drive sheave 95 is mounted on the shaft 94 at the left end of the platform and a belt 96 drivingly connects the sheave 95 to the input sheave 91 of the wobble drive. A belt tension mechanism, indicated generally by the numeral 97, is mounted on the left side panel 30 to provide proper belt tension for the belt 96, regardless of the position of the cutter bar 80 and the wobble type drive 88 mounted thereon. The tension mechanism includes a fixed sheave 98, around which the inside of the belt moves, and a swingable sheave 99 that is mounted on an arm 100, which is swingable about a transverse pivot 102, the sheave 99 engaging the back side of the belt 96. The sheave 99 is mounted on one end of the arm and the other end of the arm is connected to one end of a generally fore and aft link 104, the other end of which is engaged by a compression spring 106, which is coaxially mounted about the link and operates between the end of the link and a bracket 108 on the side panel 30. As is apparent, the spring urges the link 104 in a rearward direction, biasing the arm in a clockwise direction about the pivot 102 against the belt 96.

As is conventional, the platform is provided with a reel 110, which is only schematically shown in the drawings. The reel is carried between a pair of fore and aft extending arms 112 at opposite ends of the platform, the reel conventionally being adjustable in a generally fore and aft direction along the arm to vary the fore and aft position of the reel. The arms are also vertically swingable about pivots 114 at their rearward ends by means of reel lift cylinders 115, so that the reel is adjustable in a vertical direction as well as the fore and aft direction.

In operation, when the platform is being used to harvest such crops as soybeans, the platform is operated with the cutter bar 80 as close to ground as possible, the skids 66 normally being level and sliding along the ground. As is apparent the tilt angle of the skids, or the angle that the skids make with the ground about a horizontal transverse axis, is zero when the skids are horizontal as shown in FIG. 2. However, in some soil conditions, it is desirable to have the skids at a slight angle relative to the ground, the cutter bar being slightly elevated, so that the platform rides on the rear of these skids. This permits the platform to avoid damage to the cutter bar in rocky areas or the like, the angled skid riding over the obstructions more easily. To achieve the tilt of the skids, it is only necessary to adjust the bolts 58, rotation of the bolts causing the channel-shaped members to swing about the pins 52, and since the channel-shaped members carry the arms 62, which, in turn, carry the skids 66, the angle of the channel-shaped members controls the angle of the skids. Since an adjusting bolt 58 is provided at each mounting means, at approximately three foot intervals along the platform, the adjustment of the individual bolts allows the adjustment of the tilt angle of the skids at different locations along the platform independent of the other locations, thereby permitting levelling of the cutter bar and the skids even when the platform is somewhat distorted because of wear or impact with a foreign object. Normally the platform is adjusted for zero tilt angle for a given tire size. As apparent from FIG. 2, if a different size tire is used on the combine other than that for which the platform is set, the height of the feeder housing pivot is changed. Thus, as in FIG. 2 when a larger tire size than normal is used, the feeder housing pivot 18 is raised to the position 18', thereby changing the tilt angle of the feeder housing, which changes the position of the platform 22 to the position 22'. This, of course, would affect the tilt angle of the skids 66. However, by adjusting the bolts 58, the tilt angle of the skids can be easily changed to accommodate the change in tire size.

The position of the cutter bar 80 relative to the auger also substantially affects the feeding of the crop, and different crops and different crop conditions require different relative positions between the cutter bar 80, the reel 110, and the auger 44. In the past, a relative position between the cutter bar and the auger has been selected that is a compromise for the various crop conditions, the compromise position normally being approximately the mid position of the fore and aft adjustment. However, in wet crops, such as rice, or in down crops, when a pick-up reel is being used, the reel fingers should move close to the ground and also close to the auger, since such crops do not normally feed well and it is necessary for the reel to positively feed the auger. To accomplish the above, it is necessary to get the cutter bar as close as possible to the auger, and therefore the cutter bar 80 is shifted to its fully retracted position, as shown in FIG. 3. As previously described, the above is accomplished by removing the bolts 76 and shifting the arms 62 to the rearward-most positions relative to the channel-shaped support members 50. Conversely, dry easy to feed crops, or in grain crops having long, dry straw, where a bat-type reel is used, it is desirable to have the reel sweep the cutter bar and to have the crop fall back onto the floor before it is engaged by the auger. Thus, it is desirable to have the cutter bar a substantial distance in front of the auger, and in such conditions, the cutter bar is adjusted to its forward-most position, as shown in FIG. 4.

Since the wobble type drive is mounted directly on the cutter bar, the above adjustment can be accomplished without affecting the cutter bar drive. The belt tension mechanism 97 is such that it provides belt tension with a large amount of belt take-up to accommodate the substantial change in positions of the wobble drive between the rearward-most and forward-most positions of the cutter bar.

We claim:

1. A harvesting platform for mobile harvesting machine comprising: a transversely elongated platform frame havng opposite sides; a platform floor extending between the opposite sides; a transverse crop conveyor means mounted on the frame above the floor for moving the crop laterally on the platform; a transverse cutter bar extending between the opposite sides of the platform frame forwardly of the floor; a drive means for driving the cutter bar and including a drive mechanism mounted on one end of the cutter bar and having a rotary input element and a reciprocating output element connected to the cutter bar; and means mounting the cutter bar on the platform frame for selective tilting adjustment about a transverse horizontal axis to vary the tilt of the cutter bar relative to the ground, the drive mechanism on the end cutter bar tilting with the cutter bar; a belt drive on one side of the platform, drivingly connected to the drive mechanism and including a belt tensioning means operative to supply belt tension regardless of the tilt position of the cutter bar and the drive mechanism mounted thereon.

2. The invention defined in claim 1 wherein the means mounting the cutter bar on the platform frame includes a plurality of transversely spaced fore and aft extending support members, means mounting the support members on the platform for rocking about a transverse, horizontal axis, adjusting means operative between the platform frame and the support members for selectively adjusting the support members about said transverse horizontal axis into different tilt positions, and a plurality of transversely spaced, generally fore and aft arms respectively connected to the respective support members and adjustable in a fore and aft direction relative thereto, the cutter bar means being mounted on the forward ends of said arms, and means for selectively connecting the arms in different fore and aft positions relative to the support members to selectively mount the cutter bar in alternate positions relative to the conveyor means.

3. A harvesting platform for a mobile harvesting machine comprising: a transversely elongated platform frame having opposite sides; a platform floor mounted on the frame and extending between the opposite sides; a transverse crop conveyor means mounted on the frame above the floor for moving the crop laterally on the platform; a transverse cutter bar extending between the opposite sides of the platform frame forwardly of the floor and including a flat, generally horizontal seal element extending rearwardly from the cutter bar and overlapping the forward end of the floor and being attachable thereto; a plurality of fore and aft channel members connected to the frame and also directly to the underside of the floor; a plurality of generally fore and aft arms respectively slidably mounted in the respective channel members; removable fastener means selectively insertable through sets of alternate bores in the arms in the channel members to lock the arms relative to the channel members in selective alternate positions to selectively vary the fore and aft position of the arms relative to the channel members, the seal element overlapping and being attachable to the floor in each of the selective alternate positions; means mounting the cutter bar on the forward ends of said arms to selectively vary the fore and aft position of the cutter bar relative to the conveyor means in response to the shifting of the arms into said alternate positions relative to the channel members, the seal element overlapping the forward end of the floor and being attached thereto in each of the alternate cutter bar positions; a drive means having a rotary input element and a reciprocating output element mounted on one end of the cutter bar for driving the cutter bar, the drive means being adjustable in a fore and aft direction with the cutter bar; and a belt drive on one side of the platform drivingly connected to the input element and including a belt take up mechanism operative to supply belt tension regardless of the position of the cutter bar relative to the rest of the platform.

4. The invention defined in claim 3 wherein the frame includes a plurality of transversely spaced reinforcing members attached to a rearward portion of the floor and respectively disposed adjacent to the channel members, the floor having a forward portion forward of and delineated from the rearward portion by a transversely extending flexible area spanning the width of the floor, the forward portion of the floor being connected to the channel members and including adjusting means operatively connecting the channel members to the reinforcing members to vertically swing the channel members and the arm carried thereby about a transverse, horizontal axis adjacent to the flexible area of the floor to adjust the tilt of the arms and the cutter bar about said axis.

* * * * *